United States Patent [19]

Absil et al.

[11] Patent Number: 4,919,790
[45] Date of Patent: Apr. 24, 1990

[54] METHOD FOR HYDROCARBON DEWAXING UTILIZING A REACTIVATED SPENT MTG ZEOLITE CATALYST

[75] Inventors: Robert P. L. Absil, Mantua; Clarence D. Chang, Princeton; Cynthia T-W. Chu, Princeton Junction; Donald J. Klocke, Somerdale, all of N.J.

[73] Assignee: Mobil Oil Corporation, New York, N.Y.

[21] Appl. No.: 264,766

[22] Filed: Oct. 31, 1988

Related U.S. Application Data

[63] Continuation-in-part of Ser. No. 145,438, Jan. 19, 1988, abandoned.

[51] Int. Cl.[5] .................. C10G 57/00; C10G 11/05; B01J 29/38; B01J 38/64
[52] U.S. Cl. ........................ 208/78; 208/120; 502/25; 502/26; 502/55; 585/408
[58] Field of Search ............... 502/25, 26, 55; 208/120, 78; 585/408

[56] References Cited

U.S. PATENT DOCUMENTS

| | | | |
|---|---|---|---|
| 3,197,399 | 7/1965 | Wight et al. | 208/111 |
| 3,354,078 | 11/1967 | Miale et al. | 208/120 |
| 3,407,148 | 10/1968 | Eastwood et al. | 208/120 |
| 3,956,102 | 5/1976 | Chen et al. | 208/93 |
| 4,016,218 | 4/1977 | Haag et al. | 585/467 |
| 4,076,842 | 2/1978 | Plank et al. | 423/328 |
| 4,358,395 | 11/1982 | Haag et al. | 585/408 |
| 4,397,827 | 8/1983 | Chu | 423/327 |
| 4,477,582 | 10/1984 | Miale | 502/26 |
| 4,481,177 | 11/1984 | Valoscik | 423/329 |
| 4,523,046 | 6/1985 | Gould et al. | 585/408 |
| 4,550,090 | 10/1985 | Degnan et al. | 502/25 |
| 4,556,477 | 12/1985 | Dwyer | 208/111 |
| 4,559,315 | 12/1985 | Chang et al. | 502/71 |
| 4,594,146 | 6/1986 | Chester et al. | 208/111 |
| 4,594,333 | 6/1986 | Chang et al. | 502/71 |
| 4,808,296 | 2/1989 | Chen | 208/120 |

OTHER PUBLICATIONS

Weisz et al., *Superactive Crystalline Aluminosilicate Hydrocarbon Catalysts*, Journal of Catalysis, vol. IV, pp. 527–529 (Aug. 1965).

W. M. Meier, *Zeolite Structures*, Procedings of the Conference of Molecular Sievs (London, 1968).

*Primary Examiner*—Paul E. Konopka
*Attorney, Agent, or Firm*—Alexander J. McKillop; Charles J. Speciale; Malcolm D. Keen

[57] ABSTRACT

A method for hydrocarbon dewaxing which utilizes a reactivated acidic zeolite catalyst deactivated from MTG processing is disclosed. The deactivated MTG catalyst is contacted with a reactivation-effective amount of an alkali metal carbonate and/or an alkaline earth metal carbonate to reactivate the catalyst. The catalyst is, thereafter, converted to the catalytically active form. The catalyst is then steamed at a temperature and for a time period sufficient to reduce its alpha value to a level which is substantially equal to that of a fresh hydrocarbon dewaxing acidic zeolite catalyst. The reactivated catalyst is than used for catalyzing hydrocarbon dewaxing processes.

10 Claims, 1 Drawing Sheet

4,919,790

METHOD FOR HYDROCARBON DEWAXING UTILIZING A REACTIVATED SPENT MTG ZEOLITE CATALYST

This application is a continuation-in-part of application Ser. No. 145,438 filed Jan. 19, 1988 and now abandoned.

BACKGROUND OF THE INVENTION

The present invention relates to a method for hydrocarbon dewaxing which utilizes a reactivated zeolite catalyst which had been deactivated or "spent" as a result of being employed in the catalytic conversion process of methanol to gasoline (MTG).

During MTG processing the catalytic activity of an intermediate pore size zeolite catalyst, such as ZSM-5, deactivates. Catalyst deactivation can generally be ascribed to the nature of the feed, the nature of the catalyst itself and/or the processing conditions. More specifically, catalyst deactivation can result from the deposition of organic matter onto the catalyst, which is typically referred to as "coking", or from a reduction in the zeolite framework aluminum content. In both instances, it is the acidic function of the zeolite catalyst that becomes diminished or destroyed.

A catalyst which has become deactivated due to coking can be regenerated by burning the organic matter from the zeolite in an oxygen-containing gas or removing the organic matter from the zeolite in a hydrogen-containing gas. In this regard, U.S. Pat. No. 4,358,395 describes that a ZSM-5 type catalyst, which has undergone controlled precoking and has become deactivated in a methanol conversion process, can be reactivated at 800° F. to about 1200° F. in an atmosphere containing hydrogen. Similarly, U.S. Pat. No. 3,956,102 describes the regeneration of a spent dewaxing catalyst by burning the deactivated catalyst in oxygen or reactivating the catalyst by contact with hydrogen for about 24 hours at 400 psig.

Although burning in an oxygen-containing gas and treatment with hydrogen are known to regenerate catalysts, these processes in general require high temperature and are costly. In the case of regeneration with hydrogen, special metallurgy is required. Furthermore, these regenerations often fail to fully restore all of the properties of the virgin catalyst. However, as mentioned earlier, these regenerations are only known to regenerate catalysts which have become deactivated from coking. Such techniques are not recognized as being effective to reactivate a zeolite which has been deactivated because of framework dealuminization.

During certain catalytic conversion processes, such as MTG processing, conditions are such that zeolite framework dealuminization might be expected. For instance, MTG processing is typically conducted at elevated temperatures and any water vapor produced is known to attack aluminum atoms present in the zeolite framework and to remove them in the form of aluminum oxide and/or hydroxide clusters. The loss of framework aluminum is detrimental to these catalysts, since catalytic activity is generally attributed to framework aluminum atoms and/or cations associated with aluminum atoms.

U.S. Pat. Nos. 4,559,315 and 4,594,333 disclose increasing the ion-exchange capacity and acid catalytic activity of a ZSM-5 type zeolite by treatment with an aqueous solution of a source of alkali metal cation, particularly preferred sources of such cation being sodium or potassium hydroxide or the sodium or potassium salts of acetic, carbonic or phosphoric acid. A method for hydrocarbon dewaxing which utilizes a reactivated catalyst deactivated from MTG processing is nowhere disclosed or suggested.

It is therefore an object of the present invention to provide a method for reactivating a deactivated zeolite catalyst.

It is a further object of the present invention to provide a method for reactivating a zeolite catalyst which has become deactivated during a catalytic conversion process by zeolite framework dealuminization.

It is another object of the present invention to provide a method for reactivating an intermediate pore size zeolite catalyst.

It is still another object of the present invention to reactivate a ZSM-5 catalyst which has become deactivated under MTG processing conditions, so that the reactivated catalyst may be used for hydrocarbon dewaxing.

SUMMARY OF THE INVENTION

To the attainment of the foregoing objects and advantages the present invention provides a method for hydrocarbon dewaxing which utilizes a reactivated acidic zeolite catalyst which had been deactivated in MTG processing. The deactivated MTG catalyst is contacted with a reactivation-effective amount of an alkali metal carbonate and/or an alkaline earth metal carbonate to reactivate the catalyst. The catalyst is then converted to the catalytically active form and steamed at a temperature and for a time period sufficient to reduce its alpha value to a level which is substantially equal to that of a fresh hydrocarbon dewaxing acidic zeolite catalyst. The reactivated catalyst is then used for catalyzing hydrocarbon dewaxing processes.

The process of the present invention is highly unexpected since laboratory and testing has shown that spent hydrocarbon dewaxing acidic zeolite catalysts could not be effectively regenerated by the method described herein and made useful for catalyzing hydrocarbon dewaxing processes.

DESCRIPTION OF THE DRAWING

The FIGURE is a graphic illustration of the reactor temperature required to make 20° F. pour lube material plotted as a function of days on stream.

DESCRIPTION OF THE PREFERRED EMBODIMENTS

Figure 1:
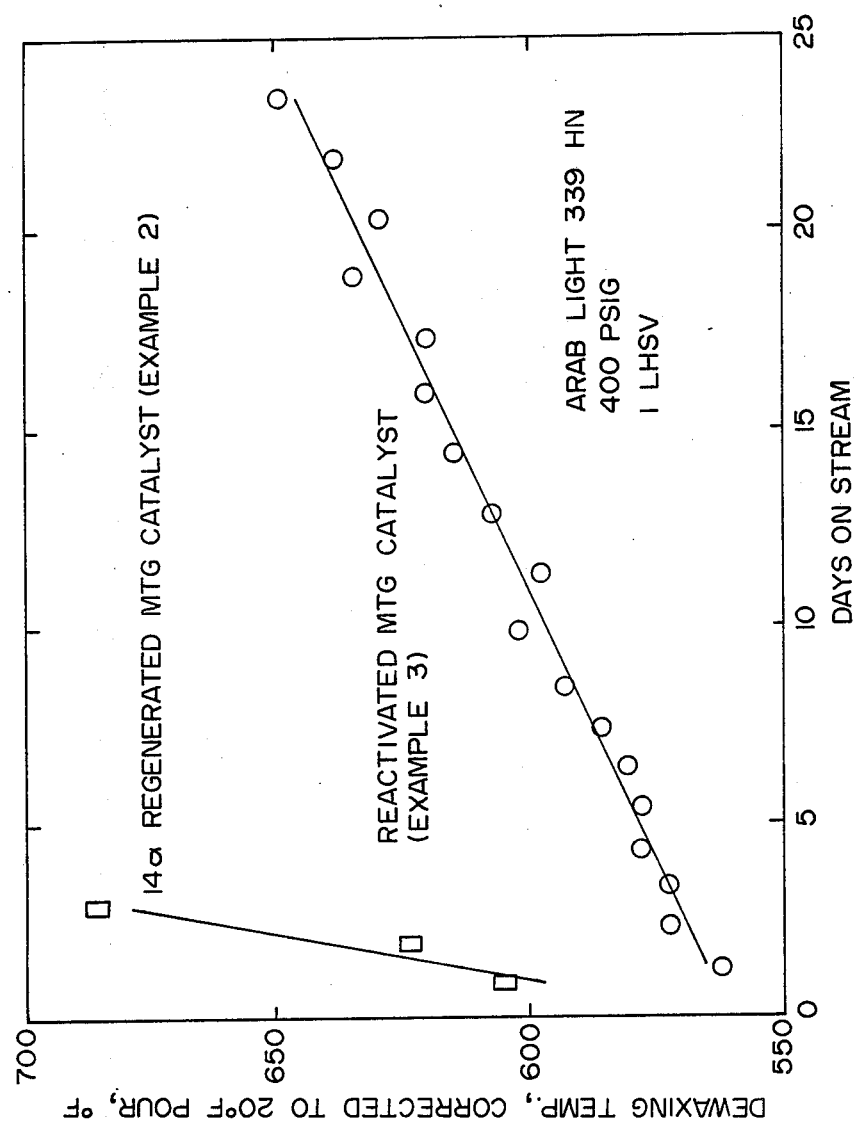

Any acidic zeolite MTG catalyst which has become substantially spent, or deactivated, during use can be suitably reactivated and rendered useful for catalyzing hydrocarbon dewaxing processes in accordance with this invention. The process of reactivation described herein is particularly well-suited for reactivating a zeolite catalyst that has become deactivated because of framework dealuminization. In general, a zeolite can be considered "spent" when, as a result of use, it has lost activity and/or selectivity such that continued use of the zeolite is not economically feasible. Such loss of activity and/or selectivity is usually ascribed to the accumulation of carbonaceous residues on catalytically active surfaces of the zeolite or to framework dealuminization.

The term "acidic" as used herein refers to any zeolite catalyst which is capable of inducing what is recognized in the art as an acid catalyzed reaction. Examples of acid catalyzed reactions include conversion of methanol to gasoline boiling range hydrocarbons, toluene disproportionation, xylene isomerization, benzene alkylation, cumene dealkylation, double bond shift, etc. As is known in the art, the acid catalytic activity of a zeolite may be measured by its "alpha value", which is the ratio of the rate constant of a test sample for cracking normal hexane to the rate constant of a standard reference catalyst. Thus, an alpha value of 1 indicates that the test sample and the reference standard have about the same activity. The alpha test is described in U.S. Pat. No. 3,354,078 and in the Journal of Catalysis, Vol. IV, pps. 522–529 (August, 1965), both of which are incorporated herein by reference. Measurement of the alpha value is useful for a variety of purposes, such as, to indicate catalyst activity before treatment, in determining the degree of activation achieved by contacting the spend catalyst with the alkali metal carbonate and/or the alkaline earth metal carbonate and in determining the catalytic activity of the catalyst reactivated in accordance with the present invention, relative to the catalyst activity of a fresh, unused catalyst. For purposes of determining the degree of activation, the zeolite is converted to the hydrogen form before evaluation and, in addition, for purposes of assessing relative catalyst activity, among others, the zeolite is steamed in the manner described hereinbelow.

This invention is particularly useful with catalysts based on zeolite of intermediate pore size. Although these zeolites have unusually low alumina contents, i.e., high silica to alumina ratios, they are very active even when the silica to alumina ratio exceeds 30. The activity is surprising since catalytic activity is generally attributed to framework aluminum atoms and/or anions associated with these aluminum atoms. These zeolites retain their crystallinity for long periods in spite of the presence of steam at high temperature which induces irreversible collapse of the framework of other zeolites, e.g., of the X and A type. Furthermore, carbonaceous deposits, when formed, can be removed by burning at higher than usual temperatures to restore activity. These zeolites, used as catalysts, generally have low coke-forming activity, and therefore, are conducive to long times on stream between regenerations. However, when framework dealuminization does occur, the catalytic activity of this type of zeolite is drastically reduced. Accordingly, when this type of zeolite experiences framework dealuminization, its utility as a catalyst is diminished. The reactivation method of the present invention restores the zeolite's catalytic activity so that it once again becomes a useful product.

An important characteristic of the crystal structure of this class of zeolites is that it provides constrained access to, and egress from, the intracrystalline free space by virtue of having an effective pore size intermediate between the small pore Linde A and the large pore Linde X, i.e., the pore windows of the structure have about a size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra. Briefly, the preferred type zeolites useful in this invention possess, in combination, a silica to alumina mole ratio of at least about 12 and a structure providing constrained access to the crystalline free space.

The silica to alumina ratio referred to may be determined by conventional analysis. This ratio is meant to represent, as closely as possible, the ratio in the rigid anionic framework of the zeolite crystal and to exclude aluminum in the binder or in the cationic or other form which may be present within the channels. Although zeolites with a silica to alumina ratio of at least about 12 are useful, it is preferred to use zeolites having ratios of at least about 30. Such zeolites, after activation, acquire an intracrystalline sorption capacity for normal hexane which is greater than that for water, i.e., they exhibit "hydrophobit" properties. It is believed that this hydrophobit character is advantageous in the present invention.

The members of the class of zeolites useful herein have an effective port size of generally from about 5 to about 8 Angstroms, such as to freely sorb normal hexane. In addition, the structure must provide constrained access to larger molecules. It is sometimes possible to judge from a known crystal structure whether such constrained access exists. For example, if the only pore window in a crystal are formed by 8-membered rings of silicon and aluminum atoms, then access by molecules of larger cross-section than normal hexane is excluded and the zeolite is not of the desired type. Windows of 10-membered rings are preferred, although, in some instances, excessive puckering of the rings or pore blockage may render these zeolites ineffective.

Although 12-membered rings in theory would not offer sufficient constraint to produce advantageous conversions, it is noted that the puckered 12-ring structure of TMA offretite does show some constrained access. Other 12-ring structures may exist which may be operative for other reasons, and therefore, it is not the present intention to entirely judge the usefullness of the particular zeolite solely from theoretical structural considerations.

A convenient measure of the extent to which a zeolite provides control to molecules of varying sizes to its internal structure is the Constraint Index of the zeolite. Zeolites which provide a highly restricted access to and egress from their internal structure have a high value for the Constraint Index, and zeolites of this kind usually have pores of small size, e.g. less than 5 Angstroms. On the other hand, zeolites which provide relatively free access to the internal zeolite structure have a low value for the Constraint Index, and usually pores of large size, e.g. greater than 8 Angstroms. The method by which Constraint Index is determined is described fully is U.S. Pat. No. 4,016,218, incorporated herein by reference for details of the method.

Constraint Index (CI) values for some typical materials, which may or may not be useful in the present invention, are:

|  | CI (at test temperature) |
| --- | --- |
| ZSM-4 | 0.5 (316° C.) |
| ZSM-5 | 6–8.3 (371° C.–316° C.) |
| ZSM-11 | 5–8.7 (371° C.–316° C.) |
| ZSM-12 | 2.3 (316° C.) |
| ZSM-20 | 0.5 (371° C.) |
| ZSM-22 | 7.3 (427° C.) |
| ZSM-23 | 9.1 (427° C.) |
| ZSM-34 | 50 (371° C.) |
| ZSM-35 | 4.5 (454° C.) |
| ZSM-48 | 3.5 (538° C.) |
| ZSM-50 | 2.1 (427° C.) |

-continued

| | CI (at test temperature) |
|---|---|
| TMA Offretite | 3.7 (316° C.) |
| TEA Mordenite | 0.4 (316° C.) |
| Clinoptilolite | 3.4 (510° C.) |
| Mordenite | 0.5 (316° C.) |
| REY | 0.4 (316° C.) |
| Amorphous Silica-alumina | 0.6 (538° C.) |
| Dealuminized Y | 0.5 (510° C.) |
| Erionite | 38 (316° C.) |
| Zeolite Beta | 0.6–2.0 (316° C.–399° C.) |

The above-described Constraint Index is an important and even critical definition of those zeolites which are useful in the instant invention. The very nature of this parameter and the recited technique by which it is determined, however, admit of the possibility that a given zeolite can be tested under somewhat different conditions and thereby exhibit different Constraint Indices. Constraint Index seems to vary somewhat with severity of operations (conversion) and the presence or absence of binders. Likewise, other variables, such as crystal size of the zeolite, the presence of occluded contaminants, etc., may affect the Constraint Index. Therefore, it will be appreciated that it may be possible to so select test conditions, e.g. temperature, as to establish more than one value for the Constraint Index of a particular zeolite. This explains the range of Constraint Indices for some zeolites, such as ZSM-5, ZSM-11 and Beta.

It is to be realized that the above CI values typically characterize the specified zeolites, but that such are the cumulative result of several variables useful in the determination and calculation thereof. Thus, for a given zeolite exhibiting a CI value within the range of 1 to 12, depending on the temperature employed during the test method within the range of 290° C. to about 538° C., with accompanying conversion between 10% and 60%, the CI may vary within the indicated range of 1 to 12. Likewise, other variables such as the crystal size of the zeolite, the presence of possibly occluded contaminants and binders intimately combined with the zeolite may affect the CI. It will accordingly be understood to those skilled in the art that the CI, as utilized herein, while affording a highly useful means for characterizing the zeolites of interest is approximate, taking into consideration the manner of its determination, with the possibility, in some instances, of compounding variable extremes. However, in all instances, at a temperature within the above-specified range of 290° C. to about 538° C., the CI will have a value for any given zeolite of interest herein within the approximate range of 1 to 12.

As previously indicated, the reactivating procedure used in this invention applies to all acidic zeolites including the large pore size materials such a zeolites X, Y and Beta, but is particularly applicable to the intermediate pore size zeolites as exemplified by ZSM-5, ZSM-11, ZSM-12, ZSM-22, ZSM-23, ZSM-35, ZSM-48, and other similar materials ZSM-5 is more particularly described in U.S. Pat. No. 3,702,886, the entire content of which is incorporated herein by reference.

ZSM-11 is more particularly described in U.S. Pat. No. 3,709,979, the entire content of which is incorporated herein by reference.

ZSM-12 is more particularly described in U.S. Pat. No. 3,832,449, the entire content of which is incorporated herein by reference.

ZSM-22 is more particularly described in U.S. Pat. Nos. 4,481,177 and 4,556,477, the entire contents of which are incorporated herein by reference.

ZSM-23 is more particularly described in U.S. Pat. No. 4,016,842, the entire content of which is incorporated herein by reference.

ZSM-35 is more particularly described in U.S. Pat. No. 4,016,842, the entire content of which is incorporated herein by reference.

ZSM-48 is more particularly described in U.S. Pat. No. 4,397,827, the entire content of which is incorporated herein by reference.

The specific zeolites described, when prepared in the presence of organic cations, are substantially catalytically inactive, possibly because the intracrystalline free space is occupied by organic cations from the forming solution. They may be activated by heating in an inert atmosphere at 1000° F. for one hour, for example, followed by calcination at 1000° F. in air. The presence of organic cations in the forming solution may not be absolutely essential to the formation of this type zeolite; however, the presence of these cations does appear to favor the formation of this special class. More generally, it is desirable to activate this type catalyst by base exchange with ammonium salts followed by calcination in air at about 1000° F. for from about 15 minutes to about 24 hours.

Natural zeolites may sometimes be converted to this type zeolite catalyst by various activation procedures and other treatments, such as, various combinations of base exchange, steaming, alumina extraction and calcination. Natural minerals which may be so treated include ferrierite, brewsterite, stilbite, dachiardite, epistilbite, heulandite, and clinoptilolite. The preferred crystalline zeolites are ZSM-5, ZSM-11, ZSM-12, ZSM-22, ZSM-23, ZSM-35, and ZSM-48, with ZSM-5 and ZSM-11 being particularly preferred. In some instances, it is advantageous to steam the fresh zeolite to reduce its activity and thereby improve its selectivity prior to use. Such improvement has been noted with steamed ZSM-5.

In a preferred aspect of this invention, the zeolites selected are those having a crystal framework density, in the dry hydrogen form, of not less than about 1.6 grams per cubic centimeter. Therefore, the preferred zeolites of this invention are those having a Constraint Index as defined above of about 1 to 12 and a dried crystal density of not less than about 1.6 grams per cubic centimeter. The dry density for known structures may be calculated from the number of silicon plus aluminum atoms per 1000 cubic Angstroms, as given, for example, on page 19 of the article on Zeolite Structure by W. M. Meier. This paper, the entire contents of which is incorporated herein by reference, is included in "Proceedings of the Conference on Molecular Sieves," London, 1968. When the crystal structure is unknown, the crystal framework density may be determined by classical pycnometer techniques. For example, it may be determined by immersing the dry hydrogen form of the zeolite in an organic solvent not sorbed by the crystal. Or, the crystal density may be determined by mercury porosimetry, since mercury will fill the interstices between individual crystals but will not penetrate the intracrystalline free space. It is possible that the unusual sustained activity and stability of this class of zeolites is associated with high crystal anionic framework density of not less than about 1.6 grams per cubic centimeter. This high density must necessarily be associated with a relatively small amount of free space within the crystal, which might be expected to result in more stable structures. This free space, however, is important as the locus of catalytic activity.

Crystal framework densities of some typical zeolites including some which are not within the purview of this invention are:

| Zeolite | Void Volume | Framework Density |
|---|---|---|
| Ferrierite | 0.28 cc/cc | 1.76 g/cc |
| Mordenite | .28 | 1.7 |
| ZSM-5, 11 | .29 | 1.79 |
| ZSM-12 | — | 1.8 |
| ZSM-23 | — | 2.0 |
| Dachiardite | .32 | 1.72 |
| L | .32 | 1.61 |
| Clinoptilolite | .34 | 1.71 |
| Laumontite | .34 | 1.77 |
| ZSM Omega | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

When synthesized in the alkali metal form, the zeolite is conveniently converted to the hydrogen form, generally by intermediate formation of the ammonium form as a result of ammonium ion exchange and calcination of the ammonium form to yield the hydrogen form. In addition to the hydrogen form, other forms of the zeolite wherein the original alkali metal has been reduced to less than about 1.5 percent by weight may be used. Thus, the original alkali metal of the zeolite may be replaced by ion exchange with other suitable metal cations of Groups I through VIII of the Periodic Table, including, by way of example, nickel, copper, zinc, palladium, calcium or rare earth metals.

The spent zeolites contemplated herein are often associated with a matrix material which is resistant to the temperature and other conditions employed in the processes which they catalyze. Such matrix materials include synthetic or naturally occurring substances, as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families, which families include the sub-bentonites and the kaolins commonly known as Dixie, McNamee-Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the spent zeolites may be composited with a porous matrix material, such as alumina, silica-magnesia, silica-zirconia, silica-thoria, silica-berylia, silica-titania, as well as ternary compositions, such as silica-alumina-thoria, silica-aluminia-zirconia, silica-alumina-magnesia and silica-magnesia-zirconia. The matrix may be in the form of a cogel. The relative proportions of zeolite component and inorganic oxide gel matrix on an anhydrous basis may vary widely with the zeolite content ranging from between about 5 to about 99 percent by weight and more usually in the range of about 10 to about 80 percent by weight of the dry composite.

The reactivation process utilized in this invention is advantageously practiced with a ZSM-5 type zeolite having a silica to alumina ratio greater than about 12 and, in particular, with a silica to alumina ratio greater than about 60:1, preferably greater than 500:1 and, still more preferably, greater than 1600:1. The sources of the spent zeolites are quite varied. In the case of intermediate pore size zeolites such as ZSM-5, the catalysts, which have become deactivated by being employed in MTG processing, are readily reactivated for use in hydrocarbon dewaxing processing in accordance with the process of this invention.

The process of the present invention is highly unexpected since both laboratory and testing has shown that spent hydrocarbon dewaxing acidic zeolite catalysts could not be effectively regenerated by the method described herein and made useful for catalyzing hydrocarbon dewaxing processes, as shown comparing the results of Examples 3–5 with the results of Examples 7–8.

Ordinarily, prior to contacting the spent zeolite with alkali metal carbonate and/or alkaline earth metal carbonate, the zeolite will be subjected to a burning operation to remove at least a major part of any accumulated carbonaceous matter or "coke". The requirements of the burning operation are well known in the art. In general, burning is carried out in the presence of an oxygen-containing gas, typically supplied as air, at temperatures of from about 500° to about 1000° F. or even higher and at oxygen concentrations of from about 0.90 to about 10 mole percent. The duration of the burning operation is not narrowly critical and will obviously vary depending on the temperature and oxygen concentration, as well as the amount of carbonaceous matter on the catalyst. A preferred burning operation would include treating a spent catalyst with about 0.2 to 7 mole percent of oxygen at temperatures of about 700° to 850° F. at pressures of 1 to 70 atmospheres.

The activation method of this invention is fairly simple. Thus, for example, a physical mixture of ZSM-5 type zeolite and a matrix material such as alumina is treated with liquid water at a temperature below its critical temperature, i.e., below about 370° C. in the presence of a reactivating amount of alkali metal carbonate and/or alkaline earth metal carbonate for a time effective to induce a significant increased acid catalytic activity.

Contemplated as useful alkali and/or alkaline earth metal carbonates are those of lithium, sodium, potassium, rubidium, cesium, calcium, magnesium, strontium and barium. Preferred alkali metal and/or alkaline earth metal carbonates are those of lithium, sodium, potassium, calcium and magnesium. The amount of alkali and/or alkaline earth metal carbonate to be used can vary widely but in all instances must be at least a reactivating amount, i.e., an amount effective to restore by a substantial amount, such as at least about 20%, the acid catalytic activity of the fresh zeolite. However, it will be seen that the present method can reactivate the spent zeolite to 100% of the acid catalytic activity of the fresh zeolite.

The amount of liquid water required is at least that amount sufficient to fill the pores of the physical mixture to be treated. However, for maximum effectiveness, and for best control of the reactivation process and reproducibility of results, it is preferred to use sufficient excess liquid water so that some or all of the physical mixture will be submerged in liquid water, i.e., it is preferred to conduct the activation in a continuous phase of liquid water. Although the method of this invention can be practiced over the whole range of temperature at which water remains liquid, i.e., from about 1° to about 370° C., reactivation is so facile that the normal boiling point of water need not be exceeded. Very substantial activation may be observed at room temperature. A particularly preferred embodiment is to conduct the activation under reflux at about the normal boiling point of water under which conditions the activity of a spent ZSM-5 sample can be increased, within as little as two hours, about twenty thousand fold from hexane cracking activity in the spent condition of about 0.02 to about 450. The duration and temperature of the reactivation treatment can vary widely. For a given spent MTG zeolite, the optimum reactivating condition can be readily determined employing routine testing. Broadly, these will be within a temperature of from about 1° to about 370° C. for a period of less than about 1 hour up to about 100 hours. A preferred temparature range is from about 10° to about 212° C. with from about 20° to about 212° C. particularly preferred. For any of these temperature ranges, the preferred treatment time is from about less than 1 hour to about 24 hours.

Following treatment with the alkali metal carbonate and/or alkaline earth metal carbonate, it is necessary to reconvert the catalyst to the hydrogen form, for example, by employing the aforestated procedures of converting the zeolite to an intermediate ammonium form as a result of ammonium ion exchange followed by calcination to provide the hydrogen form. The operational requirements of these procedures are well known in the art and require no elaboration here.

At this stage of treatment the spent MTG catalyst is reactivated but has an alpha value of about 800. Since the alpha value of a fresh catalyst is about 200 to about 220, the catalyst whose alpha value is about 800 is steamed to reduce lo the alpha value to substantially the same level as that of a fresh catalyst. Thus, it is preferable to subject the catalyst to steaming under conditions which would reduce the acid activity of the catalyst which, in turn, reduces the alpha value of the catalyst from about 800 down to about 190 to about 240. Maximized or increased surface acidity, is undesirable, since it can result in nonselective cracking. As merely illustrative, the catalyst can be steamed at a temperature of about 650° F. to about 1000° F. at 0 psig with 100% steam for about 5 hours. It is clearly within the scope of the present invention to vary the time, temperature and pressure parameters to reduce the alpha value of the catalyst within the desired range. For instance, steaming at lower temperatures would occur for a longer time period and, perhaps, at a higher pressure in order to attain the desired alpha value.

The zeolites which have been modified in accordance with the present invention are thus made well-suited for use as catalysts in hydrocarbon conversion operations, such as lube dewaxing.

The following examples are presented to provide a further illustration of the present invention:

EXAMPLE 1

A spent MTG catalyst was regenerated by burning off any carbonaceous matter present on the catalyst in the presence of an oxygen-containing gas. The regenerated catalyst, which had a alpha value of 14, was then treated with a 0.5M $Na_2CO_3$ solution (pH=11.5) for 8 hours under reflux conditions. The resulting catalyst was washed with deionized water and then treated with 1M $NH_4NO_3$ for two (2) hours under reflux conditions, and for one (1) hour at room temperature. The resulting extrudate was washed with deionized water, dried at 250° F. and calcined at 1000° F. for three (3) hours in flowing air. A heating rate of 5° F./minute was employed. The extrudate had an alpha value of 830 and a sodium content of ~0.1 wt %. The reactivated catalyst had a crush strength of 71 lb/inch. The crush strength was substantially unaffected by the reactivation procedure.

EXAMPLE 2

A spent MTG catalyst was regenerated in the manner of Example 1, i.e., by burning off any carbonaceous matter present on the catalyst in an oxygen-containing gas. The regenerated catalyst, which had an alpha value of 14, was sized to 14/28 mesh (packing density of 0.62 g/cc) and, after sulfiding, was evaluated for use as a catalyst in the dewaxing of Arab Light Heavy Neutral raffinate at 1 LHSV, 400 psig and 2500 scf $H_2$/B. The physical properties of the raffinate used as feedstock are summarized below in Table I.

TABLE I

| Physical Properties of Arab Light 339 HN Raffinate | |
|---|---|
| Pour Point (°F.) | 115.00 |
| K.V. at 100° C., cs | 11.86 |
| K.V. at 300° F., cs | 4.636 |
| Gravity (API) | 28.00 |
| Sulfur (wt %) | 1.14 |
| Nitrogen (ppm) | 75.00 |
| Hydrogen (wt %) | 13.69 |
| Aniline Point (°F.) | 229.00 |

The raffinate was introduced into the unit at 545° F.; and 80° F. pour lube product was produced after the first day on stream. In an attempt to produce 20° F. pour lube product, the reactor temperature was increased to 599° F. As a result, 45° F. pour lube product was produced the second day. The reactor temperature was increased to 681° F. and 25° F. pour lube product was made on the third day on stream. The catalyst of this example was not able to make 20° F. pour lube product below the end-of-cycle (EOC) temperature (675° F.).

EXAMPLE 3

The reactivated catalyst of Example 1 (830α) was steamed at 800° F. and 1 atm. steam for 5 hours to minimize surface activity and, as a result, to reduce the alpha value. The alpha value was effectively reduced to 220 (±25). The steamed catalyst was sized to 14/28 mesh (packing density of 0.59 g/cc) and, after sulfiding, was evaluated for dewaxing the same raffinate feedstock described in Example 2. The raffinate was introduced into the unit at 573° F.; and 10° F. lube product was produced after the first day on stream. The reactor temperature was adjusted to maintain a lube pour point to 20° F. In FIG. 1, the reactor temperature, required to make 20° F. pour lube material, is plotted as a function of days on stream. Using a correction factor of 1° F.

pour point/1° F. reactor temperature, an aging rate of 3.7° F. /day and a start of cycle (SOC) temperature of 560° F. are obtained, respectively.

Thus, a spent MTG catalyst, when reactivated in accordance with the present invention (Example 3), can be economically employed in a subsequent hydrocarbon conversion process, such as lube dewaxing.

EXAMPLE 4

A fresh commerical MLDW catalyst was used in dewaxing substantially the same raffinate as employed in Examples 2 and 3. The properties of the lube product produced appear below in Table II.

TABLE II

| Lube Properties | A | B |
|---|---|---|
| Pour Point (°F.) | 15 | 30 |
| KV at 40° C. (cs) | 147.9 | 145.7 |
| KV at 100° C. (cs) | 13.60 | 13.69 |
| VI | 85 | 88 |
| VI (at 20° F.) | 86 | 86 |
| Sulfur (wt %) | 1.36 | 1.37 |
| Nitrogen (ppm) | 100 | 100 |
| Gravity (API) | 25.8 | 25.9 |

EXAMPLE 5

The catalyst reactivated in accordance with Example 3 produced lube product with properties that appear in Table III below:

TABLE III

| Lube Properties | C |
|---|---|
| Pour Point, (°F.) | 30 |
| KV at 40° C., (cs) | 145.4 |
| KV at 100° C., (cs) | 13.77 |
| VI | 89.3 |
| VI (at 20° F.) | 87.3 |
| Sulfur, (wt %) | 1.18 |
| Nitrogen, (ppm) | 100 |
| Gravity, (API) | 26.0 |

TABLE IV illustrates the yield structures obtained when producing the lube products which properties are detailed in Tables II and III; appropriate operating conditions have been included for reference.

TABLE IV

| | Example 4 | | Example 5 |
|---|---|---|---|
| | A | B | C |
| HDW Temp. (°F.) | 591 | 629 | 606 |
| H$_2$ Pressure (psig) | 400 | 400 | 400 |
| LHSV | 0.97 | 0.95 | 0.97 |
| Yields | wt % of liquid charge | | |
| C$_1$-C$_3$ | 3.6 | 2.0 | 2.7 |
| C$_4$'s | 5.2 | 3.6 | 4.0 |
| C$_5$'s | 3.1 | 2.9 | 2.6 |
| C$_6$-650° F. | 5.3 | 8.7 | 5.2 |
| 650° F.+ | 83 | 83 | 85 |
| 650° F.+ (20° F.) | 84 | 81 | 83 |
| Mat'l Balance (wt %) | 101 | 101 | 101 |

As this data demonstrates, a spent MTG catalyst, which has been reactivated in accordance with the present invention, exhibits substantially equivalent lube yields and (viscosity Indecies (vIs) relative to those recognized when a fresh MLDW catalyst is employed.

EXAMPLE 6

A nickel containing catalyst which had been removed from a commercial dewaxing unit after regeneration was treated with a 0.5M Na$_2$CO$_3$ solution (pH=11.5) using substantially the same procedure as detailed in Example 1. The treated catalyst had an alpha activity of 235.

EXAMPLE 7

The reactivated (235α) catalyst of Example 6 was crushed to 14/28 mesh (packed density of 0.57 g/cc) and, after sulfiding, was evaluated for dewaxing the same raffinate feedstock described in Example 2. The raffinate was introduced into the unit at 565° F.; and 45° F. lube product was produced after 0.7 days on-stream. The reactor temperature was increased in an attempt to produce 20° F. pour lube product. The results are summarized in Table V.

TABLE V

| Time on-stream (Days) | Reactor Temperature (°F.) | Lube Pour Point (°F.) |
|---|---|---|
| 0.7 | 565 | 45 |
| 1.7 | 580 | 25 |
| 2.7 | 590 | 50 |
| 3.7 | 630 | 20 |
| 5.2 | 650 | 25 |
| 6.7 | 670 | 45 |
| 7.7 | 675 | 50 |

Using a correction factor of 1° F. pour point/ 1° F. reactor temperature, an aging rate of 18° F./day and a start of cycle temperature of 570° F. are obtained, respectively. The performance of this catalyst is substantially poorer compared to the performance of a fresh dewaxing catalyst described in Example 4, or the steamed, reactivated MTG catalyst described in Example 3.

Thus, while there have been described what we presently believe to be the preferred embodiments of the present invention, other and further changes and modifications can be made thereto without departing from the true scope of the invention, and it is intended to claim all such changes and modifications.

What is claimed is:

1. A method for hydrocarbon dewaxing, utilizing a reactivated acidic zeolite catalyst deactivated from converting methanol to gasoline by framework dealuminization and deposition of coke on the catalyst, which comprises:
    (a) subjecting the deactivated catalyst to a burning operation in the presence of an oxygen containing gas to remove at least a major part of the accumulated coke from the catalyst;
    (b) contacting the burned catalyst with an aqueous solution of an alkali metal carbonate and/or an alkaline earth metal carbonate at a temperature of from about 1° to about 370° C. for from about 1 to about 100 hours employing from about 0.001 to about 1 molar aqueous carbonate:
    (c) converting the catalyst from step (b) to the catalytically active hydrogen form;
    (d) steaming the reactivated catalyst of step (c) at a temperature and for a time period sufficient to reduce its alpha value to a level which is substantially equal to that of a fresh hydrocarbon dewaxing acidic zeolite catalyst; and
    (e) using the reactivated catalyst of step (d) in hydrocarbon dewaxing processes.

2. The method of claim 1 wherein the zeolite is an intermediate pore size zeolite.

3. The method of claim 2 wherein the intermediate pore size zeolite is ZS-5.

4. The method of claim 1 wherein the zeolite is a large pore size zeolite.

5. The method of claim 4 wherein the large pore size zeolite is X, Y or Beta.

6. The method of claim 1 wherein the zeolite is present in admixture with a matrix material.

7. The method of claim 1 wherein the zeolite is present in admixture with alumina or an alumina-containing matrix material.

8. The method of claim 1 wherein the carbonate includes lithium, sodium, potassium, calcium or magnesium.

9. The method of claim 1 wherein the deactivated MTG acidic zeolite catalyst including an intermediate pore size zeolite, the carbonate includes lithium, sodium, potassium, calcium or magnesium at a concentration of from about 0.001 to about 1 molar, and the deactivated MTG zeolite catalyst is contacted with an aqueous carbonate at a temperature of from about 1° to about 370° C. for from about 1 to about 100 hours.

10. The method of claim 1 wherein the reactivated catalyst is converted to the hydrogen form by ammonium ion exchanging the catalyst resulting from step (a) to change the catalyst into the ammonium form and, thereafter, calcining the catalyst in the ammonium form to yield the hydrogen form.

* * * * *